(12) United States Patent
Quisenberry

(10) Patent No.: US 10,760,827 B2
(45) Date of Patent: Sep. 1, 2020

(54) METHOD AND SYSTEM FOR MAXIMIZING THE THERMAL PROPERTIES OF A THERMOELECTRIC COOLER AND USE THEREWITH IN ASSOCIATION WITH HYBRID COOLING

(71) Applicant: ThermoTek, Inc., Flower Mound, TX (US)

(72) Inventor: Tony Quisenberry, Highland Village, TX (US)

(73) Assignee: THERMOTEK, INC., Flower Mound, TX (US)

( * ) Notice: Subject to any disclaimer, the term of this patent is extended or adjusted under 35 U.S.C. 154(b) by 50 days.

(21) Appl. No.: 16/251,770

(22) Filed: Jan. 18, 2019

(65) Prior Publication Data

US 2019/0154314 A1     May 23, 2019

Related U.S. Application Data

(63) Continuation of application No. 15/227,491, filed on Aug. 3, 2016, now Pat. No. 10,215,454, which is a continuation of application No. 13/250,159, filed on Sep. 30, 2011, now Pat. No. 9,435,553.

(60) Provisional application No. 61/388,399, filed on Sep. 30, 2010.

(51) Int. Cl.
| | | |
|---|---|---|
| F25B 21/02 | (2006.01) |
| B60H 1/00 | (2006.01) |
| B60H 1/32 | (2006.01) |
| F25B 25/00 | (2006.01) |
| F24F 5/00 | (2006.01) |
| F25B 15/00 | (2006.01) |

(52) U.S. Cl.
CPC .......... *F25B 21/02* (2013.01); *B60H 1/00478* (2013.01); *B60H 1/3201* (2013.01); *B60H 1/32011* (2019.05); *B60H 1/32284* (2019.05); *F24F 5/0042* (2013.01); *F25B 25/00* (2013.01); *F25B 15/00* (2013.01)

(58) Field of Classification Search
CPC ...... F25B 21/02; F25B 15/00; B60H 1/00478; B60H 1/3201; F24F 5/0042
See application file for complete search history.

(56) References Cited

U.S. PATENT DOCUMENTS

| | | |
|---|---|---|
| 2,416,152 A | 2/1947 | Braun et al. |
| 2,713,655 A | 7/1955 | Grubman |
| 2,979,923 A | 4/1961 | Bury |

(Continued)

FOREIGN PATENT DOCUMENTS

| | | |
|---|---|---|
| DE | 3730830 A1 | 3/1989 |
| DE | 4036210 A1 | 5/1992 |

(Continued)

OTHER PUBLICATIONS

U.S. Appl. No. 13/250,159, Quisenberry.

(Continued)

*Primary Examiner* — Elizabeth J Martin
(74) *Attorney, Agent, or Firm* — Shackelford, Bowen, McKinley & Norton, LLP

(57) ABSTRACT

A cooling system including a first cooling apparatus thermally exposed to a space to be cooled. The cooling system further includes a second cooling apparatus thermally exposed to the space to be cooled and thermally exposed to the first cooling apparatus. Heat discharged from the second cooling apparatus powers the first cooling apparatus.

7 Claims, 9 Drawing Sheets

(56) References Cited

U.S. PATENT DOCUMENTS

| | | |
|---|---|---|
| 3,040,538 A | 6/1962 | Alsing |
| 3,087,309 A | 4/1963 | Toulmin, Jr. |
| 3,088,288 A | 5/1963 | Elfving |
| 3,138,934 A | 6/1964 | Roane et al. |
| 3,197,342 A | 7/1965 | Neild |
| 3,226,602 A | 12/1965 | Elfving |
| 3,630,272 A | 12/1971 | Kelly |
| 3,817,043 A | 6/1974 | Zoleta |
| 4,290,273 A | 9/1981 | Meckler |
| 4,301,658 A | 11/1981 | Reed |
| 4,306,613 A | 12/1981 | Christopher |
| 4,328,677 A | 5/1982 | Meckler |
| 4,347,474 A | 8/1982 | Brooks et al. |
| 4,449,576 A | 5/1984 | Baum et al. |
| 4,463,569 A | 8/1984 | McLarty |
| 4,478,277 A | 10/1984 | Friedman et al. |
| 4,490,982 A | 1/1985 | Christmas |
| 4,631,728 A | 12/1986 | Simons |
| 4,685,081 A | 8/1987 | Richman |
| 4,709,323 A | 11/1987 | Lien |
| 4,718,249 A | 1/1988 | Hanson |
| 4,955,203 A | 9/1990 | Sundhar |
| 5,035,052 A | 7/1991 | Suzuki et al. |
| 5,079,618 A | 1/1992 | Farnworth |
| 5,097,829 A | 3/1992 | Quisenberry |
| 5,128,517 A | 7/1992 | Bailey et al. |
| 5,172,689 A | 12/1992 | Wright |
| 5,174,121 A | 12/1992 | Miller |
| 5,190,032 A | 3/1993 | Zacoi |
| 5,197,291 A | 3/1993 | Levinson |
| 5,197,294 A | 3/1993 | Galvan et al. |
| 5,255,520 A | 10/1993 | O'Geary et al. |
| 5,269,146 A | 12/1993 | Kerner |
| 5,279,128 A | 1/1994 | Tomatsu et al. |
| 5,315,830 A | 5/1994 | Doke et al. |
| 5,361,587 A | 11/1994 | Hoffman |
| 5,371,665 A | 12/1994 | Quisenberry et al. |
| 5,450,727 A | 9/1995 | Ramirez et al. |
| 5,505,046 A | 4/1996 | Nelson et al. |
| 5,524,439 A | 6/1996 | Gallup et al. |
| 5,528,485 A | 6/1996 | Devilbiss et al. |
| 5,561,981 A | 10/1996 | Quisenberry et al. |
| 5,588,300 A | 12/1996 | Larsson et al. |
| 5,964,092 A | 10/1999 | Tozuka et al. |
| 6,029,471 A | 2/2000 | Taylor |
| 6,058,712 A | 5/2000 | Rajasubramanian et al. |
| 6,205,805 B1 | 3/2001 | Takahashi et al. |
| 6,295,819 B1 | 10/2001 | Mathiprakasam et al. |
| 6,434,955 B1 | 8/2002 | Ng et al. |
| 6,453,678 B1 | 9/2002 | Sundhar |
| 6,490,874 B2 | 12/2002 | Chu et al. |
| 6,591,614 B2 | 7/2003 | Smith et al. |
| 6,598,405 B2 | 7/2003 | Bell |
| 6,705,089 B2 | 3/2004 | Chu et al. |
| 6,722,139 B2 | 4/2004 | Moon et al. |
| 6,880,346 B1 | 4/2005 | Tseng et al. |
| 6,935,409 B1 | 8/2005 | Parish, IV et al. |
| 6,978,630 B2 | 12/2005 | Wensink et al. |
| 7,171,822 B2 | 2/2007 | Allen et al. |
| 7,237,397 B2 | 7/2007 | Allen |
| 7,238,101 B2 | 7/2007 | Kadle et al. |
| 7,240,494 B2 | 7/2007 | Akei et al. |
| 7,245,494 B2 | 7/2007 | Cheng |
| 7,246,496 B2 | 7/2007 | Goenka et al. |
| 7,278,269 B2 | 10/2007 | Pham et al. |
| 7,296,416 B2 | 11/2007 | Akei et al. |
| 7,305,843 B2 | 12/2007 | Quisenberry et al. |
| 7,310,953 B2 | 12/2007 | Pham et al. |
| 7,370,486 B2 | 5/2008 | Grimm et al. |
| 7,394,655 B1 | 7/2008 | O'Keeffe |
| 8,443,613 B2 | 5/2013 | Quisenberry et al. |
| 8,839,633 B2 | 9/2014 | Quisenberry et al. |
| 2003/0140636 A1 | 7/2003 | Van Winkle |
| 2004/0025516 A1 | 2/2004 | Van Winkle |
| 2004/0250994 A1 | 12/2004 | Chordia |
| 2006/0034053 A1 | 2/2006 | Parish et al. |
| 2006/0075758 A1 | 4/2006 | Rice et al. |
| 2006/0144073 A1 | 7/2006 | Lee et al. |
| 2006/0225441 A1 | 10/2006 | Goenka et al. |
| 2006/0285331 A1 | 12/2006 | Wang et al. |
| 2007/0101740 A1 | 5/2007 | Akei et al. |
| 2007/0101747 A1 | 5/2007 | Eisenhour |
| 2007/0163270 A1 | 7/2007 | Chien et al. |
| 2007/0204627 A1 | 9/2007 | Pan |
| 2008/0006040 A1 | 1/2008 | Peterson et al. |
| 2008/0028768 A1 | 2/2008 | Goenka |
| 2008/0110179 A1 | 5/2008 | Rice |
| 2008/0156034 A1 | 7/2008 | Cur et al. |
| 2008/0257395 A1 | 10/2008 | Jovanovic et al. |
| 2010/0050659 A1 | 3/2010 | Quisenberry et al. |
| 2012/0085105 A1 | 4/2012 | Quisenberry |
| 2014/0352328 A1 | 12/2014 | Quisenberry et al. |

FOREIGN PATENT DOCUMENTS

| | | |
|---|---|---|
| EP | 0478204 A2 | 4/1992 |
| GB | 2164135 A | 3/1986 |
| GB | 2174792 A | 11/1986 |
| GB | 2250337 A | 6/1992 |
| GB | 2260191 A | 4/1993 |
| JP | 57138415 A | 8/1982 |
| JP | 57188855 A | 11/1982 |
| JP | 7-106640 A | 4/1995 |
| JP | 8136422 A | 5/1996 |
| KR | 20100019140 A | 2/2010 |
| WO | WO-99/10191 A1 | 3/1999 |

OTHER PUBLICATIONS

U.S. Appl. No. 13/864,627, Quisenberry et al.
U.S. Appl. No. 15/227,491, Quisenberry.
Solar Panels Plus, "Yazaki Aroace Solar Air Conditions: Solar Powered Absorption Chillers and Heating", http://www.solarpanelsplus.com/yazaki-solar-HVAC/, May 26, 2010, (1page).
Cooling Mode, http://www.eurocooling.com/public_html/articleseagroup_file/image008.jpg, Mar. 4, 2010, (1 page).
Absorption Refrigerator, http://en.wikipedia.org/wiki/Gas_absorption_refrigerator, Mar. 4, 2010, (5 pages).
Refrigeration, http://en.wikipedia.org/wiki/Refrigeration, Mar. 1, 2010, (10 pages).
Young, Lee W., "International Search Report" for PCT/US11/54278 dated Feb. 29, 2012, 3 pages.

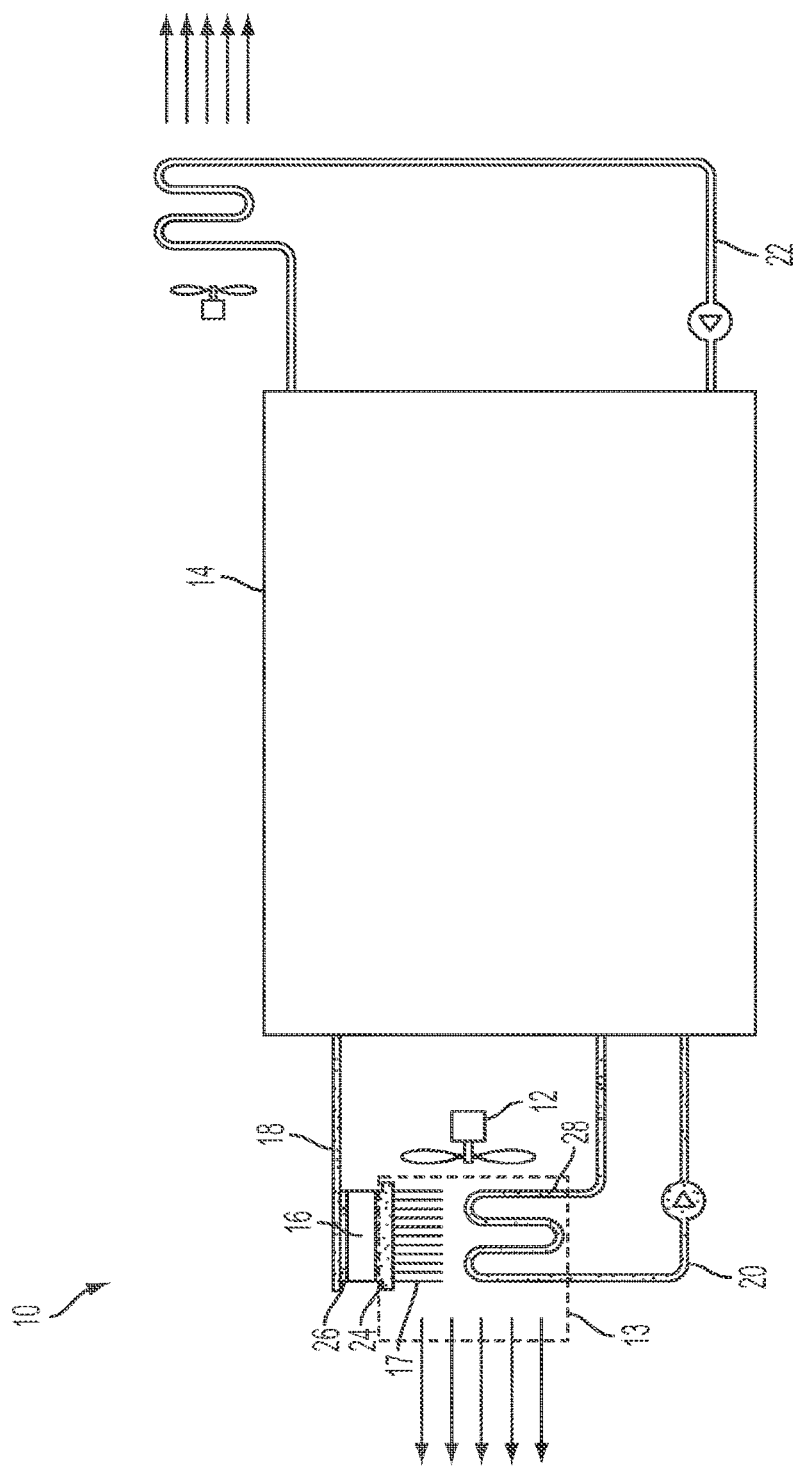

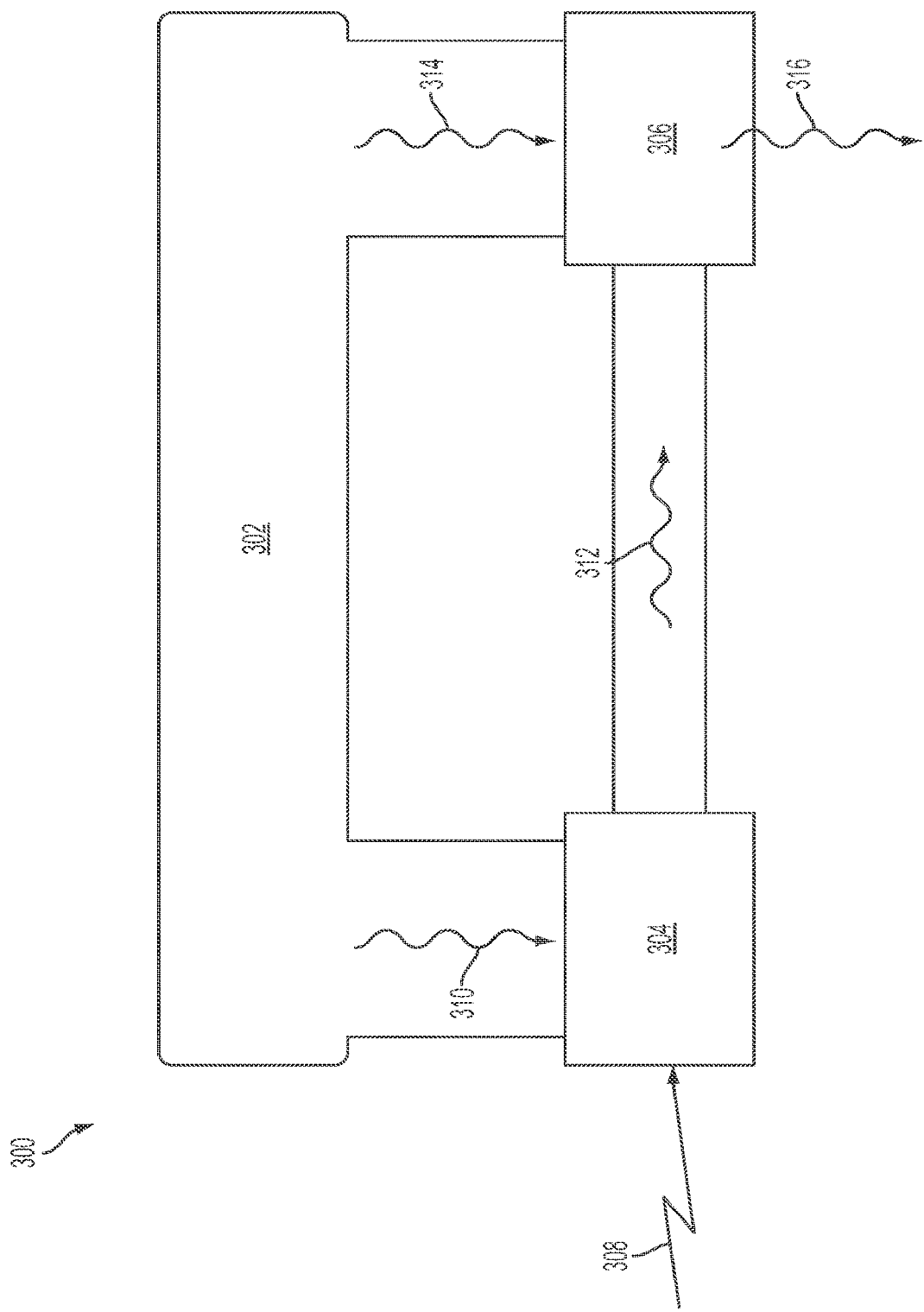

METHOD AND SYSTEM FOR MAXIMIZING THE THERMAL PROPERTIES OF A THERMOELECTRIC COOLER AND USE THEREWITH IN ASSOCIATION WITH HYBRID COOLING

CROSS-REFERENCE TO RELATED APPLICATIONS

This application is a continuation of U.S. patent application Ser. No. 15/227,491, filed on Aug. 3, 2016. U.S. patent application Ser. No. 15/227,491 is a continuation of U.S. patent application Ser. No. 13/250,159, filed on Sep. 30, 2011. U.S. patent application Ser. No. 13/250,159 claims the benefit under 35 U.S.C. § 119(e) of U.S. Provisional Patent Application No. 61/388,399, filed Sep. 30, 2010. This application incorporates by reference, for any purpose, the entire disclosure of U.S. patent application Ser. No. 15/227,491; U.S. patent application Ser. No. 13/250,159; U.S. Provisional Patent Application No. 61/388,399; U.S. patent application Ser. No. 12/549,319, filed Aug. 27, 2009; and U.S. Pat. No. 6,058,712, issued May 9, 2000.

BACKGROUND

Field of the Invention

The present application relates generally to cooling methods and systems, and more particularly, but not by way of limitation, to cooling methods and systems utilizing waste heat to power a cooling process. In another aspect, the present application relates generally to maximizing the thermal properties of a thermoelectric cooler, and more particularly, but not by way of limitation, to methods and systems related to a thermally isolated thermoelectric cooler wherein waste heat is utilized.

History of the Related Art

Refrigeration is a process of removing heat from either a substance or an enclosed space. The laws of thermodynamics dictate that heat may only be added or removed from a space through application of energy. Application of energy to facilitate removal of heat from a space is known as a refrigeration cycle. Refrigeration cycles typically differ on the nature of energy that is applied. For example, one such refrigeration cycle is a vapor-compression cycle. The vapor-compression cycle is found in most household refrigerators as well as in many large commercial and industrial refrigeration systems. The vapor-compression cycle utilizes mechanical work, in the form of a compressor, to transfer heat to a refrigerant. The heat is then discharged from the refrigerant to a heat sink.

Another refrigeration cycle is known as absorption refrigeration. In absorption refrigeration, a heat source such as, for example, a kerosene-fueled flame or induction type heater is used to provide energy to power a cooling system. Thermal energy is, therefore, applied in absorption refrigeration. Absorption refrigeration is based on the Thermodynamic principle of latent heat of vaporization. That is, evaporation carries heat, in the form of faster-moving molecules, from one material to another material that preferentially "absorbs" the faster-moving molecules. A well-known example of absorption refrigeration is human sweating. The water in sweat evaporates and is absorbed into the air thus carrying heat away from the body. Absorption refrigeration is a popular alternative to vapor-compression refrigeration, particularly in environments where electricity is unreliable, unavailable, or costly.

A third type of refrigeration is known as thermoelectric cooling. In thermoelectric cooling, a thermoelectric element is used. The thermoelectric element provides cooling through the Peltier Effect. Upon application of a voltage, the thermoelectric element creates a heat flux between a junction of two different types of materials thereby transferring heat from one side of the thermoelectric element to the other. Electrical energy is, therefore, applied in thermoelectric cooling.

In most applications, the thermoelectric element is employed such that a cooler side of the thermoelectric element is thermally exposed to an area to be cooled and a warmer side of the thermoelectric element is exposed to a thermal reservoir or a heat sink. Thus, in conventional use, a thermoelectric element is typically disposed in an open thermal system. That is, heat discharged from the warmer side of the thermoelectric element is typically exhausted to the atmosphere and lost. It would be advantageous if heat discharged from the warmer side of the thermoelectric element could be utilized, thereby allowing the thermoelectric element to be utilized in a closed thermal system.

For example, U.S. Pat. No. 6,295,819, assigned to Midwest Research Institute, discloses a heat pump fluid circuit using a thermoelectric cooler. In this device, fluid is routed across both a hot side and a cold side of a thermoelectric cooler; however, the specification discloses that this is done for the purpose of alternatively delivering heat and cold. That is, the system does not make simultaneous use of the hot side and the cold side of the thermoelectric cooler, thus requiring an exhaust of waste heat via a fan.

Regardless of the refrigeration cycle employed, the laws of thermodynamics dictate that energy can neither be created nor destroyed during operation of any refrigeration cycle. Heat removed from a space to be cooled must be eventually transferred to a heat sink. This is typically termed waste heat. In addition, waste heat is a common byproduct of many mechanical processes such as, for example, operation of an internal combustion engine. In most applications, waste heat is simply lost; however, waste heat has potential to be captured and utilized for other applications.

SUMMARY

The present invention relates generally to cooling methods and systems. In one aspect, the present invention relates to a cooling system. The cooling system includes a first cooling apparatus thermally exposed to a space to be cooled. The cooling system further includes a second cooling apparatus thermally exposed to the space to be cooled and thermally exposed to the first cooling apparatus. Heat discharged from the second cooling apparatus powers the first cooling apparatus.

In another aspect, the present invention relates to a method for maximizing thermal properties of a thermoelectric element. The method includes thermally insulating the thermoelectric element from an exterior environment and thermally exposing a cold side of the thermoelectric element to a space to be cooled. The method further includes discharging heat from the space to be cooled via a hot side of the thermoelectric element and powering a secondary cooling apparatus with the heat discharged from the space to be cooled.

In another aspect, the present invention relates to a cooling system of the type employing a cascading arrangement of cooling cycles. The cooling system includes a plenum having a volume of air moving therethrough and an absorption cooling system comprising an absorbent and a refrigerant. A chiller coil is disposed within an interior region of the plenum. The chiller coil is fluidly coupled to the absorption cooling system. The cooling system further includes a heat pipe coupled to, and thermally exposed to, the absorption cooling system and a thermoelectric element comprising a hot side and a cold side. The cold side is thermally exposed to the interior region of the plenum. The hot side is thermally exposed to the heat pipe. Heat removed from the interior region of the plenum via the thermoelectric element powers the absorption cooling system.

BRIEF DESCRIPTION OF THE DRAWINGS

For a more complete understanding of the present invention and for further objects and advantages thereof, reference may now be had to the following description taken in conjunction with the accompanying drawings in which:

FIG. 1B is a schematic diagram of a cooling system according to an exemplary embodiment;

FIG. 8 is a block diagram of a thermal system according to an exemplary embodiment.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1A:
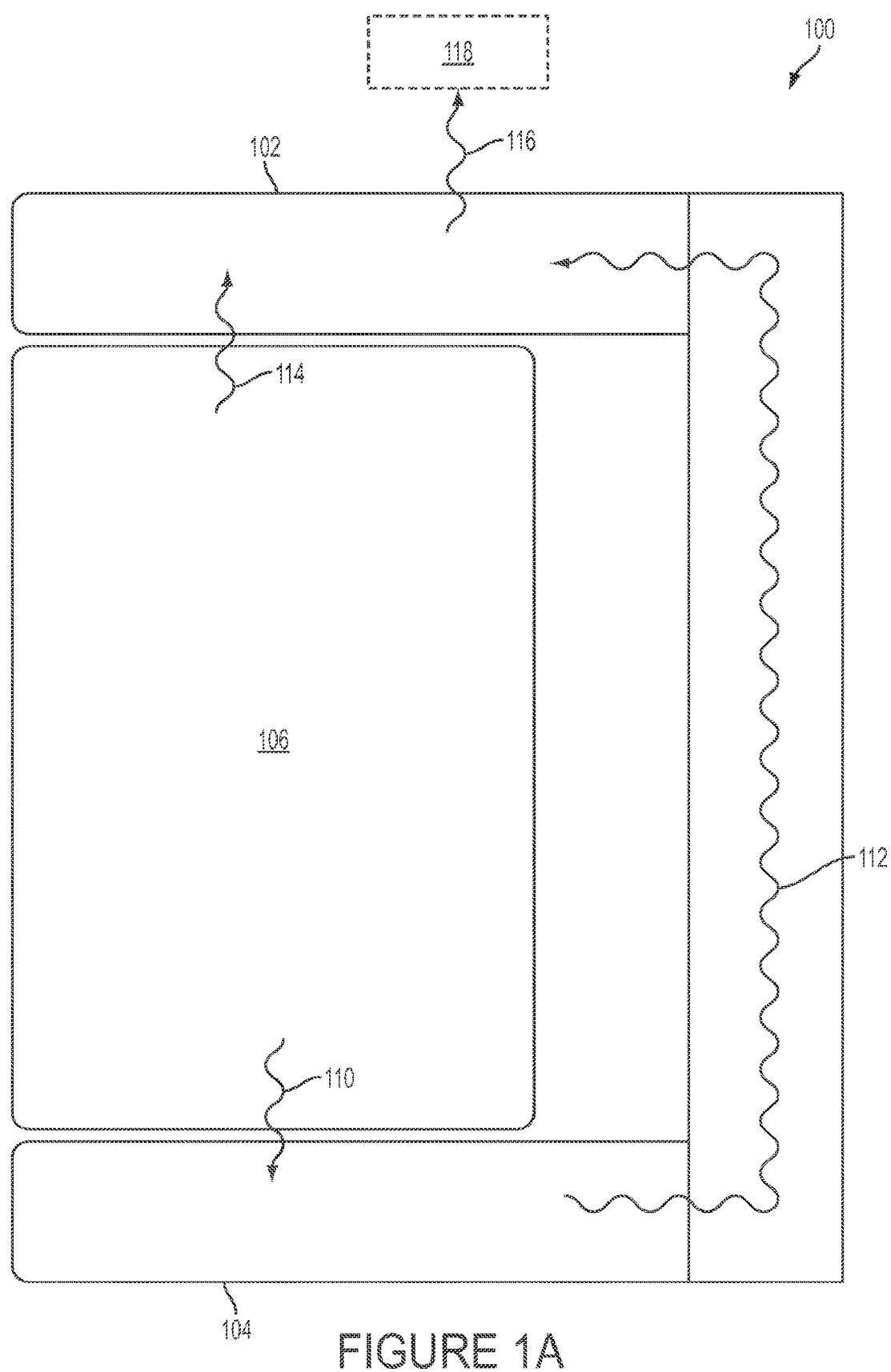
FIG. 1A is a block diagram of a cooling system according to an exemplary embodiment.

FIG. 1A is a block diagram of a cooling system according to an exemplary embodiment. A cooling system 100 includes a first cooling apparatus 102 and a second cooling apparatus 104. The first cooling apparatus 102 and the second cooling apparatus 104 are each thermally exposed to a space to be cooled 106. In a typical embodiment, the first cooling apparatus 102 is, for example, an absorption cooling system and the second cooling apparatus 104 is, for example, a thermoelectric element; however, in various alternative embodiments, other active or passive cooling systems could be utilized. The second cooling apparatus 104 is positioned to absorb heat (shown in FIG. 1A as arrow 110) from the space to be cooled 106. The absorbed heat is discharged by the second cooling apparatus 104 to the first cooling apparatus 102 and used to power the first cooling apparatus 102 (shown in FIG. 1A as arrow 112). The first cooling apparatus 102 absorbs additional heat (shown in FIG. 1A as arrow 114) from the space to be cooled 106. The first cooling apparatus discharges heat (shown in FIG. 1A as arrow 116) to a heat sink 118.

FIG. 1B is a schematic diagram of a cooling system according to an exemplary embodiment. A cooling system 10 includes a fan 12, a plenum 13, an absorption refrigeration system 14, a thermoelectric element 16, a heat pipe 18, a chiller loop 20, and an exhaust loop 22. In a typical embodiment, the heat pipe 18 is constructed from any appropriate material such as, for example, aluminum or various ceramics. Further, in various embodiments, the heat pipe 18 includes a protective coating that reduces corrosion of the heat pipe 18. In a typical embodiment, a cold side 24 of the thermoelectric element 16 is placed in thermal communication with an interior region of the plenum 13. In various embodiments, at least one fin 17 is placed on the cold side 24 of the thermoelectric element 16 to increase a heat-transfer surface area of the cold side 24.

Still referring to FIG. 1B, a hot side 26 of the thermoelectric element 16 is located outside of the plenum 13. In a typical embodiment, the hot side 26 of the thermoelectric element 16 is in thermal communication with the heat pipe 18. The heat pipe 18 conducts heat from the hot side 26 of the thermoelectric element 16 to the absorption refrigeration system 14. In a typical embodiment, the chiller loop 20 connects the plenum 13 with the absorption refrigeration system 14. The chiller loop 20 includes a coil 28 disposed in an interior region of the plenum 13. In a typical embodiment, the fan 12 moves air through the plenum 13 into an interior space of, for example, a vehicle.

Still referring to FIG. 1B, in a typical embodiment, the fan 12 moves air through the plenum 13 and through the at least one fin 17 and the coil 28. In a typical embodiment, air moves through the plenum into a space such as, for example, an interior of a vehicle (not explicitly shown). A voltage is applied to the thermoelectric element 16 resulting in a heat flux between the cold side 24 and the hot side 26 of the thermoelectric element 16. Heat is removed from air moving through the plenum 13 and transferred into the heat pipe 18. In a typical embodiment, the heat pipe 18 provides heat necessary to power the absorption refrigeration system 14. The absorption refrigeration system 14 provides a heat-transfer fluid 29 to the plenum 13 by way of the chiller loop 20. Heat removed from the chiller loop 20 by the absorption refrigeration system 14 is transferred to the environment through the exhaust loop 22. Thus, the chiller loop 20 also removes heat from the interior region of the plenum 13. In this sense, the cooling system 10 utilizes a cascading arrangement of refrigeration cycles where heat removed from the plenum 13 by the thermoelectric element 16 is used to power the absorption refrigeration system 14. In a typical embodiment, the absorption refrigeration system 14 provides supplemental cooling via the chiller loop 20.

Still referring to FIG. 1B, operation the absorption refrigeration system 14 typically has an associated ramp-up time prior to the absorption refrigeration system 14 reaching steady-state operation. In a typical embodiment, the thermoelectric element 16 reduces an effective ramp-up time associated with the cooling system 10.

Figure 2:
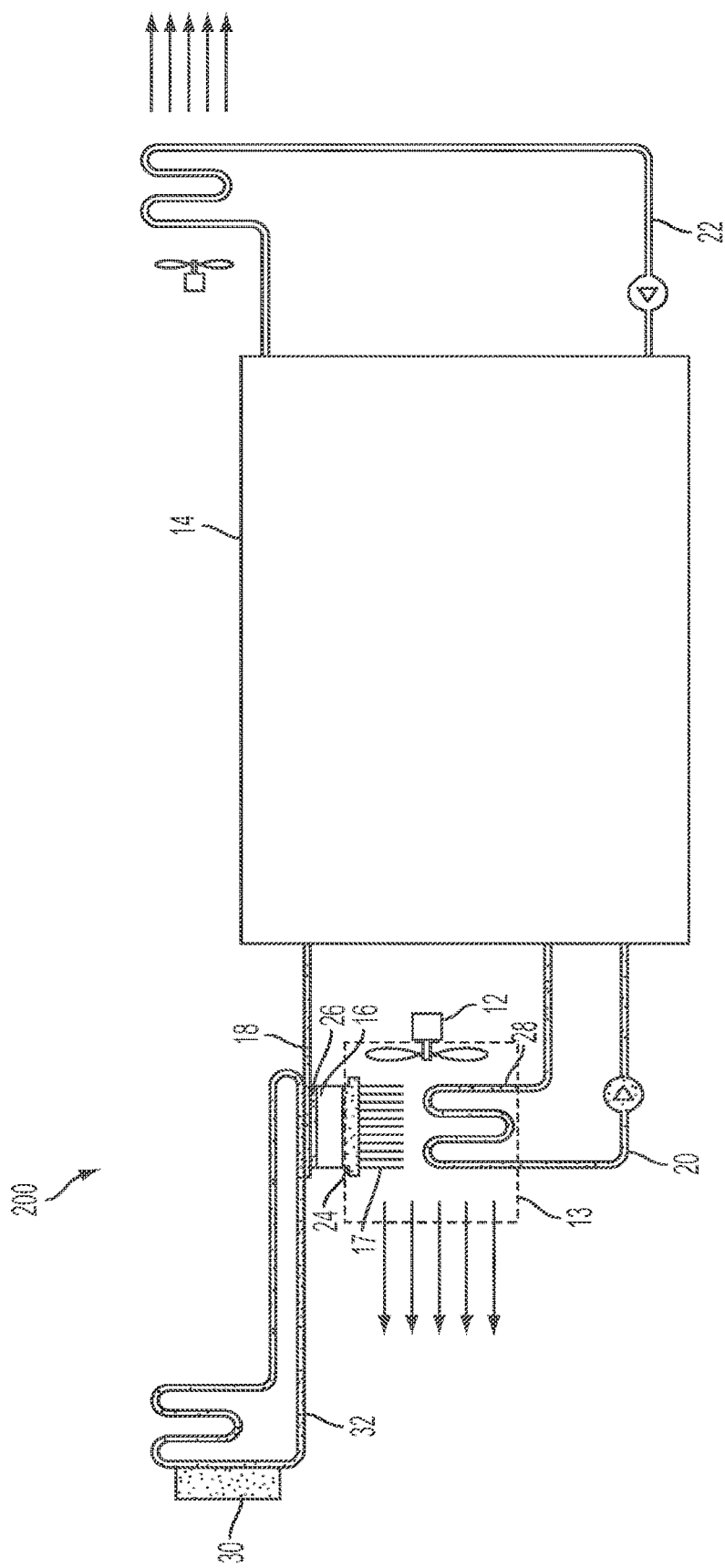
FIG. 2 is a schematic diagram of a cooling system according to an exemplary embodiment.

FIG. 2 is a schematic diagram of a cooling system according to an exemplary embodiment. In FIG. 2, a cooling system 200 includes the fan 12, the plenum 13, the absorption refrigeration system 14, the thermoelectric element 16, the heat pipe 18, the chiller loop 20, and the exhaust loop 22 as arranged and described in FIG. 1B with respect to the cooling system 10. The cooling system 200 further includes a secondary heat source 30 that is thermally coupled to the heat pipe 18. The secondary heat source 30 may be any source of heat such as, for example, an internal-combustion vehicular engine, a hybrid vehicular engine, an electric vehicular motor, or any other source of heat. In various embodiments, a heat-transfer loop 32 is employed to transfer heat from the secondary heat source 30 to the heat pipe 18. In other embodiments, the secondary heat source 30 may be directly thermally exposed to the heat pipe 18. In this sense, the cooling system 200 re-uses heat that is discharged from the secondary heat source 30.

Still referring to FIG. 2, during operation, the heat-transfer loop 32 conducts heat from the secondary heat source 30 to the heat pipe 18. The heat pipe 18 then conducts heat absorbed from the heat-transfer loop 32 to the absorption refrigeration system 14. Thus, the secondary heat source 30, in combination with the thermoelectric element 16, provides heat required to power the absorption refrigeration system 14. In this sense, heat discharged by the secondary heat source 30 is re-used to provide power to the absorption refrigeration system 14.

Figure 3:
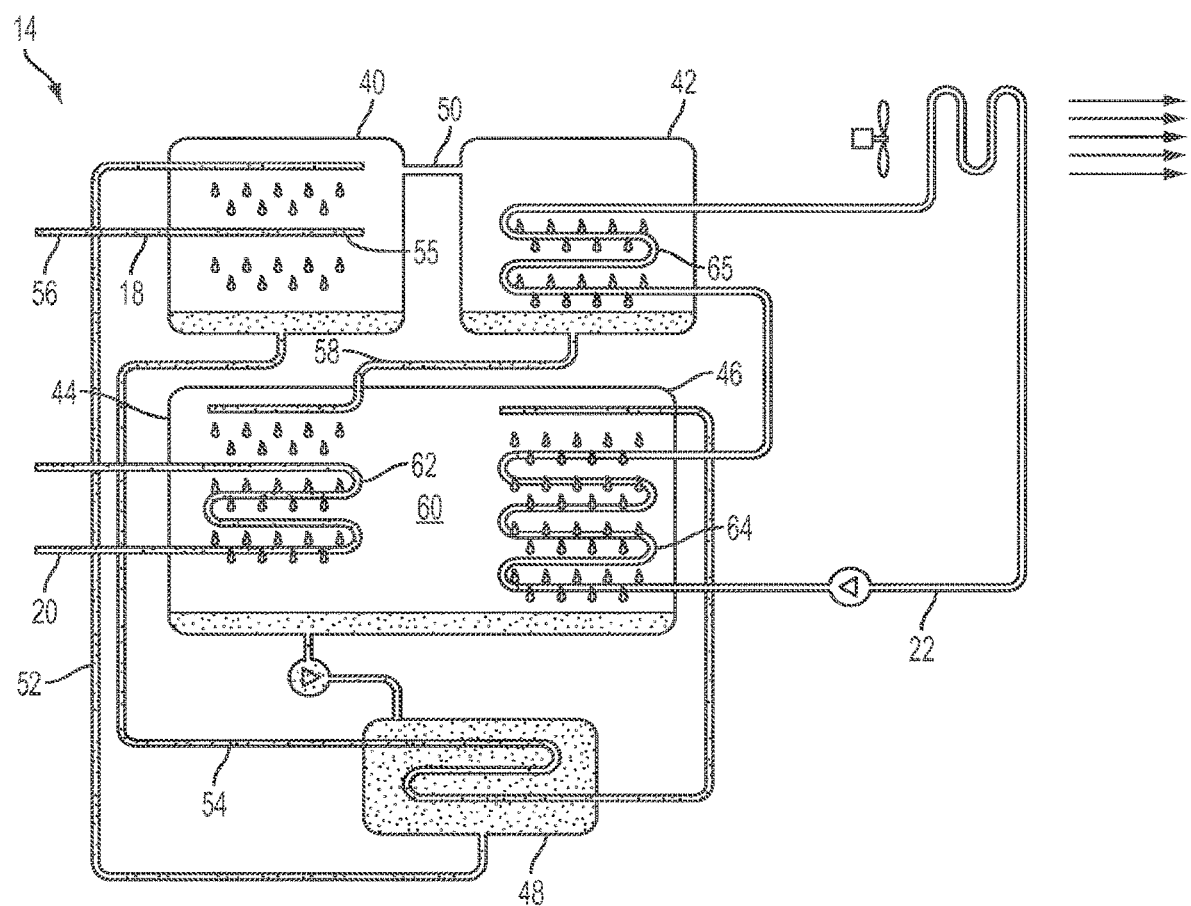
FIG. 3 is a schematic diagram of the absorption cooling system according to an exemplary embodiment.

FIG. 3 is a detailed schematic diagram of an absorption refrigeration system according to an exemplary embodiment. The absorption refrigeration system 14 includes a generator 40, a condenser 42, an evaporator 44, an absorber 46, and a heat exchanger 48. The generator 40 is connected to the condenser 42 by way of a passage 50. The generator 40 is also connected to the absorber 46, via the heat exchanger 48, by way of a dilute-solution line 52 and a concentrated-solution line 54. In a typical embodiment, the heat pipe 18 is arranged such that a first end 55 of the heat pipe 18 is placed inside the generator 40 and a second end 56 of the heat pipe 18 is thermally exposed to the hot side 26 of the thermoelectric element 16 (shown in FIGS. 1B-2).

Still referring to FIG. 3, the condenser 42 is connected to the evaporator 44 by way of a refrigerant-liquid line 58. The evaporator 44 is connected to the absorber 46 by way of a passage 60. The chiller loop 20 includes a coil 62 which is placed inside the evaporator 44. Similarly, the exhaust loop 22 includes a coil 64 which is placed inside the absorber 46 and a coil 65 which is inside the condenser 42.

Still referring to FIG. 3, during operation, the absorption refrigeration system 14 is charged with, for example, a refrigerant and an absorbent. In a typical embodiment, the refrigerant is, for example, water; however, one skilled in the art will recognize that any liquid capable of a vapor state could be utilized as a refrigerant. Likewise, in a typical embodiment, the absorbent may be, for example, lithium bromide (LiBr); however, one skilled in the art will recognize that any appropriate absorbent could be used such as, for example, glycol, ammonia, antifreeze, or any combination thereof. In addition, in a typical embodiment, the generator 40, the condenser 42, the evaporator 44, and the absorber 46 are de-pressurized to a near-vacuum state. The near-vacuum state substantially reduces a boiling point of both the refrigerant and the absorbent.

Figure 4:
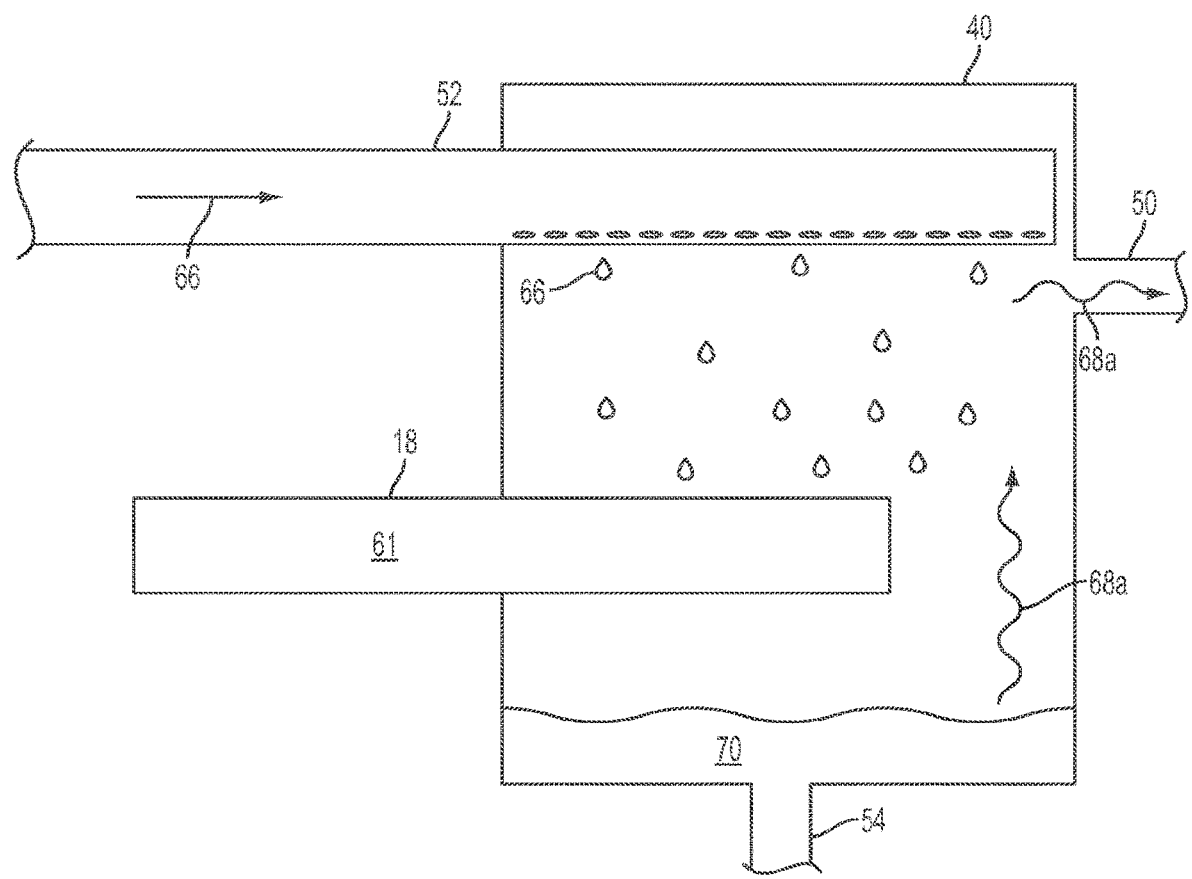
FIG. 4 is a schematic diagram of a generator of an absorption cooling system of FIG. 3 according to an exemplary embodiment.

FIG. 4 is a schematic diagram of a generator of an absorption cooling system according to an exemplary embodiment. In a typical embodiment, application of heat to the heat pipe 18 vaporizes a heat-transfer fluid 61 contained within the heat pipe 18. The heat-transfer fluid 61 conducts heat produced by the thermoelectric element 16 (shown in FIGS. 1B-2) into the generator 40. In a typical embodiment, use of the heat pipe 18 to conduct heat into the generator 40 provides several advantages over conventional absorption coolers. Most notably, use of the heat pipe 18 allows passive conduction of heat into the generator 40 thereby eliminating need for a fluid pump. In addition, use of the heat pipe 18 allows for efficient transfer of heat between the thermoelectric element 16, the heat pipe 18, and the generator 40.

Still Referring to FIG. 4, in a typical embodiment, a dilute solution 66, including the refrigerant and the absorbent, is introduced to the generator 40 by way of the dilute-solution line 52. Low pressure inside the generator 40 causes the refrigerant to vaporize yielding a refrigerant vapor 68a and a concentrated solution 70 comprising the refrigerant and the absorbent. Vaporization of the refrigerant absorbs energy from the heat pipe 18 thereby cooling the heat-transfer fluid 61 contained therein. In a typical embodiment, the concentrated solution 70 collects in a bottom region of the generator 40 and is drained via the concentrated-solution line 54. In a typical embodiment, the refrigerant vapor 68a travels through the passage 50 into the condenser 42 (shown in FIG. 5).

In various alternative embodiments, the heat pipe 18 is not included. In such embodiments, a heat-transfer-fluid loop (not explicitly shown) is utilized to transfer heat from the hot side 26 of the thermoelectric element 16 to the generator 40. In another embodiment, the hot side 26 of the thermoelectric element 16 is placed in direct contact with the generator 40.

Figure 5:
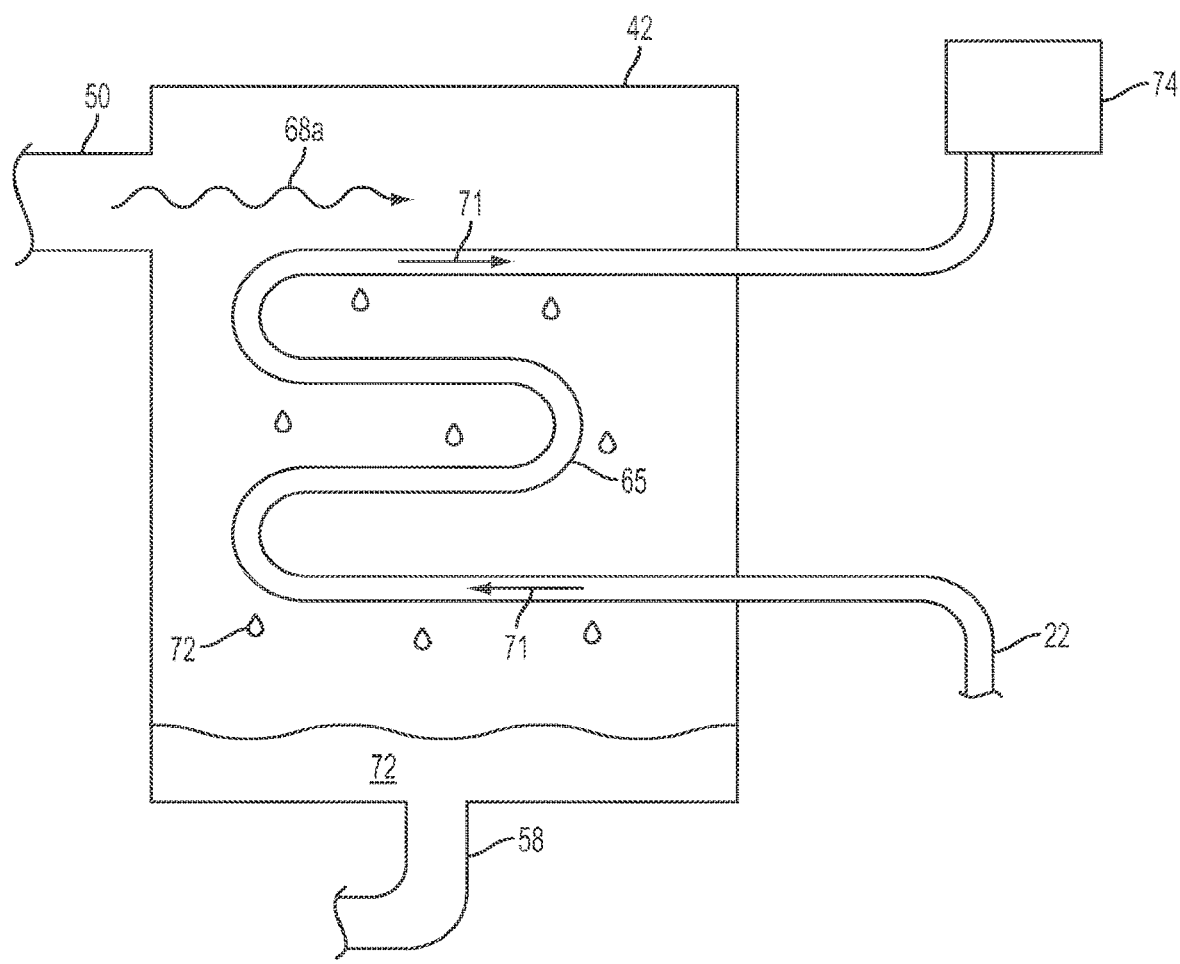
FIG. 5 is a schematic diagram of a condenser of the absorption cooling system of FIG. 3 according to an exemplary embodiment.

FIG. 5 is a schematic diagram of a condenser of an absorption cooling system according to an exemplary embodiment. In the condenser 42, the refrigerant vapor 68a interacts with the coil 65 of the exhaust loop 22. In a typical embodiment, interaction between the refrigerant vapor 68a and the coil 65 causes the refrigerant vapor 68a to condense yielding a refrigerant liquid 72. The refrigerant liquid 72 collects in a bottom region of the condenser 42 and is passed to the evaporator 44 (shown in FIG. 6) by way of the refrigerant-liquid line 58. In a typical embodiment, latent heat, absorbed by the coil 65 during condensation of the refrigerant vapor 68a, is passed to a heat-transfer fluid 71. Heat absorbed by the heat-transfer fluid 71 is then transferred to a heat sink 74.

Figure 6:
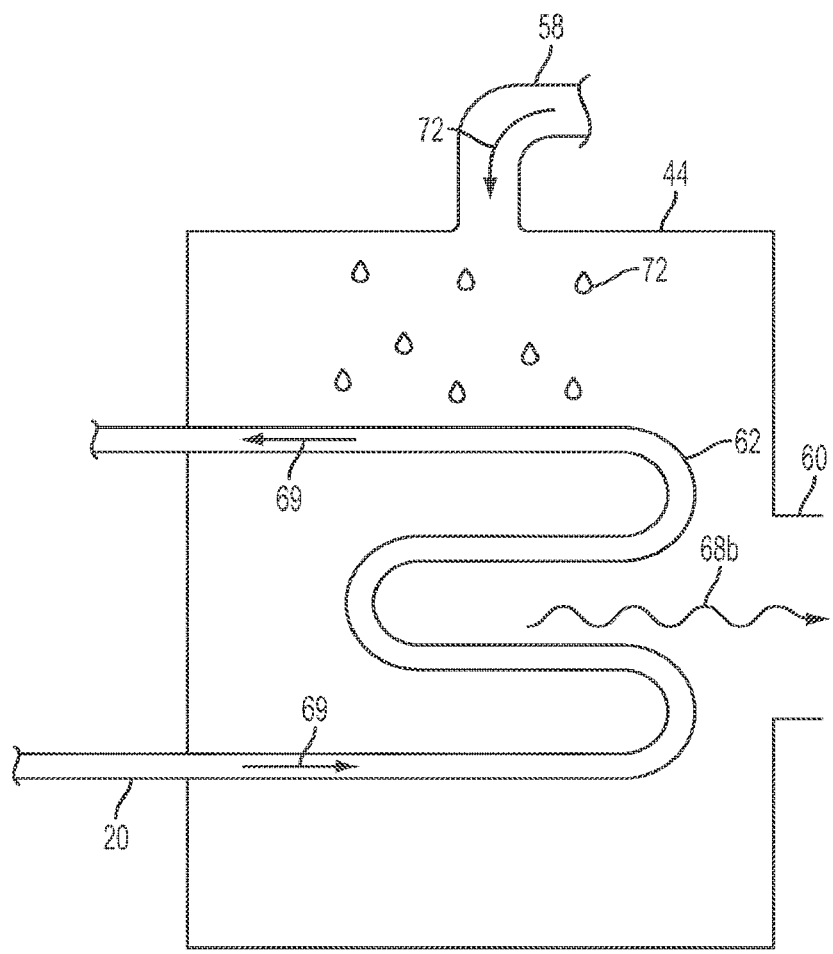
FIG. 6 is a schematic diagram of an evaporator of the absorption cooling system of FIG. 3 according to an exemplary embodiment.

FIG. 6 is a schematic diagram of an evaporator of an absorption cooling system according to an exemplary embodiment. The refrigerant liquid 72 is introduced to the evaporator 44 by way of the refrigerant-liquid line 58. In the evaporator 44, the refrigerant liquid 72 interacts with the coil 62 of the chiller loop 20. In a typical embodiment, pressure inside the evaporator 44 and the absorber 46 (shown in FIG. 7) is less than pressure inside the generator 40 (shown in FIG. 4) and the condenser 42 (shown in FIG. 5). Thus, as the refrigerant liquid 72 flows over the coil 62, the refrigerant liquid 72 boils yielding a refrigerant vapor 68b. In another embodiment, an expansion valve (not explicitly shown) may be used to facilitate boiling of the refrigerant liquid 72. A heat-transfer fluid 69 is circulated through the chiller loop 20. In a typical embodiment, the heat-transfer fluid 69 may be, for example, water, glycol, mineral oil, or any other appropriate fluid or fluid combination. In a typical embodiment, boiling of the refrigerant liquid 72 removes heat from the heat-transfer fluid 69. The chiller loop is thus able to provide additional cooling to the plenum 13 (shown in FIGS. 1B-2). The refrigerant vapor 68b then passes to the absorber 46 (shown in FIG. 7) by way of the passage 60.

Figure 7:
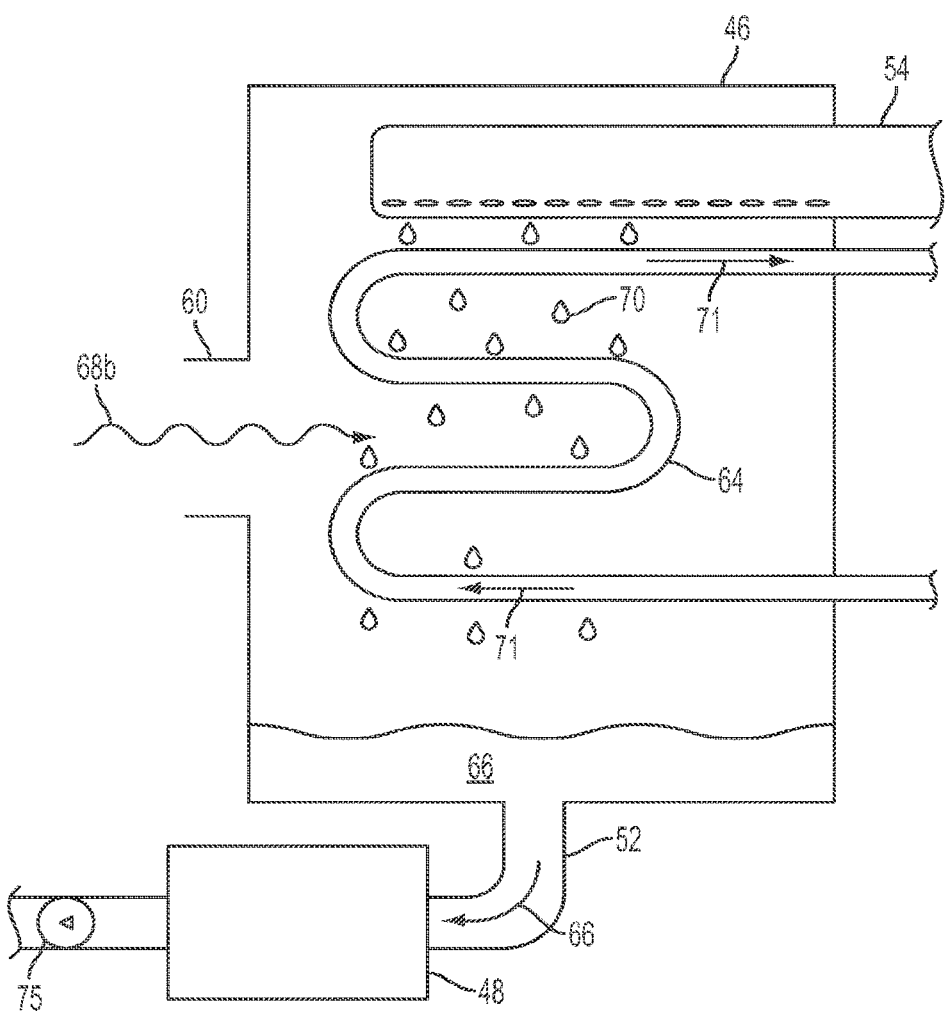
FIG. 7 is a schematic diagram of an absorber of the absorption cooling system of FIG. 3 according to an exemplary embodiment.

FIG. 7 is a schematic diagram of an absorber of an absorption cooling system according to an exemplary embodiment. The concentrated solution 70 is introduced into the absorber 46 via the concentrated-solution line 54. The refrigerant vapor 68b is introduced into the absorber 46 via the passage 60. The refrigerant vapor 68b is absorbed by the concentrated solution 70 flowing over the coil 64 resulting in the dilute solution 66. The dilute solution 66 is drained from the absorber 46 by the dilute-solution line 52. In a typical embodiment, during absorption of the refrigerant vapor 68b, heat of condensation and heat of dilution are transferred to the heat-transfer fluid 71 within the coil 64 and transferred to the heat sink 74 (shown in FIG. 1B). A pump 75 circulates the dilute solution 66 to the generator 40 (shown in FIG. 4). Prior to being returned to the generator 40, the dilute solution 66 is pre-heated in the heat exchanger 48.

FIG. 8 is a block diagram of a thermal system wherein the thermal properties of a thermoelectric cooler are maximized according to an exemplary embodiment. A system 300 includes a plenum 302, a thermoelectric element 304, and a secondary cooling cycle 306. During operation, electric energy 308 is applied the thermoelectric element 304 thereby generating a heat flux across the thermoelectric element 304. As a result of the heat flux generated across the thermoelectric element 304, heat (shown in FIG. 8 by arrow 310) is conducted out of the plenum 302 and across the thermoelectric element 304. The thermoelectric element 304 discharges heat (shown in FIG. 8 by arrow 312) to the secondary cooling cycle 306. In a typical embodiment, due to the second law of thermodynamics, the heat 310 is substantially equal to the heat 312.

Still referring to FIG. 8, in a typical embodiment, the heat 312 powers the secondary cooling cycle 306. As a result, the secondary cooling cycle 306 conducts additional heat (shown in FIG. 8 by arrow 314) from the plenum 302. Heat (shown in FIG. 8 by arrow 316) is discharged by the secondary cooling cycle 306 to a heat sink (not explicitly shown). In this sense, the thermoelectric element 304 need not be thermally exposed to an external heat sink and, thus, may be entirely insulated within the system 300.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A method for maximizing thermal properties of a thermoelectric element, the method comprising:
    thermally exposing a cold side of the thermoelectric element to a space to be cooled;
    removing heat from the space to be cooled through the thermoelectric element;
    discharging the heat removed from the space to be cooled from the thermoelectric element to an absorption system;
    transmitting heat from the heat-transfer fluid contained in a heat pipe to the absorption cooling system.

2. The method of claim 1, comprising arranging the heat pipe between a hot side of the thermoelectric element and the absorption system.

3. The method of claim 1, comprising utilizing a heat source to power the absorption system.

4. The method of claim 3, wherein a heat-transfer loop transfers heat from the heat source to the absorption system.

5. The method of claim 1, wherein the absorption system removes heat from the space to be cooled.

6. A cooling system of the type employing a cascading arrangement of cooling cycles, the cooling system comprising:
    a plenum having a volume of air moving therethrough;
    an absorption cooling system comprising an absorbent and a refrigerant;
    a chiller coil disposed within an interior region of the plenum, the chiller coil fluidly coupled to the absorption cooling system;
    a heat pipe coupled to, and thermally exposed to, the absorption cooling system; and
    a thermoelectric element comprising a hot side and a cold side, the cold side being thermally exposed to the interior region of the plenum, the hot side being thermally exposed to the heat pipe.

7. The cooling system of claim 6, comprising a secondary heat source, wherein the secondary heat source is thermally exposed to the absorption cooling system.

* * * * *